Dec. 17, 1929.  L. D. SOUBIER  1,739,873
APPARATUS FOR FEEDING MOLTEN GLASS
Filed Oct. 31, 1925
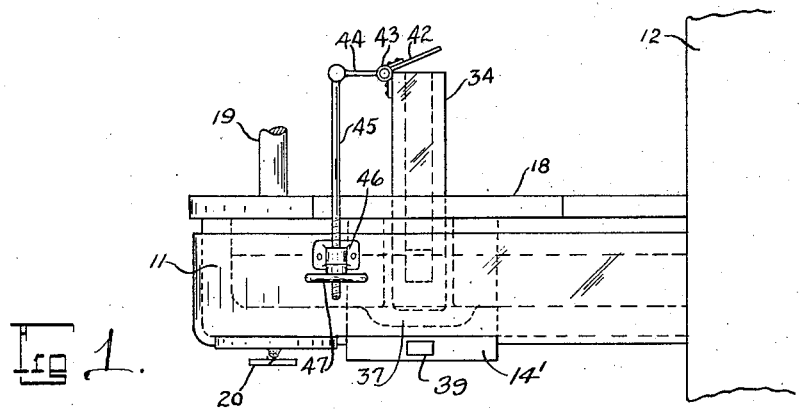
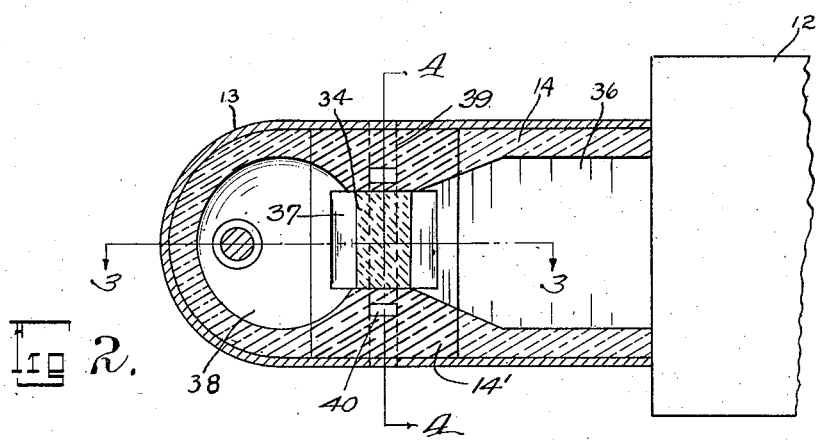
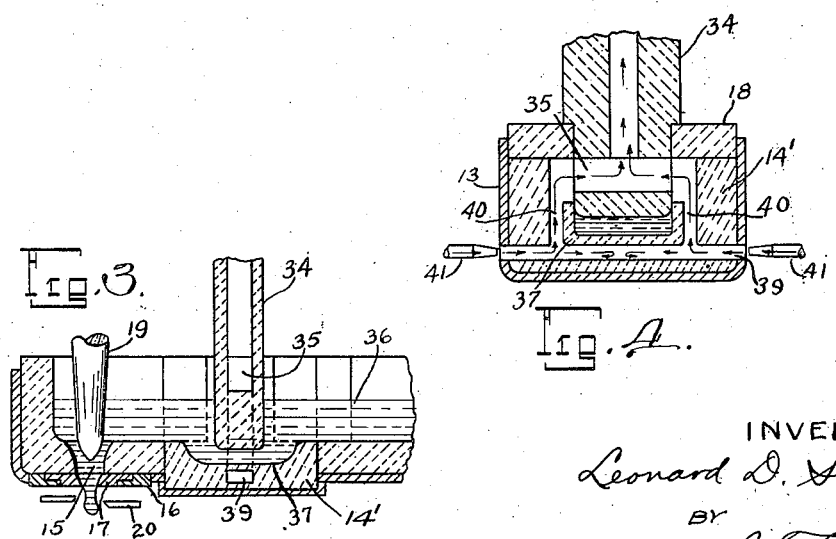
INVENTOR
Leonard D. Soubier
BY
J. F. Rule
HIS ATTORNEY Patented Dec. 17, 1929

1,739,873

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR FEEDING MOLTEN GLASS

Application filed October 31, 1925. Serial No. 65,953.

My invention relates to improvements in apparatus for supplying molten glass from a tank or furnace, and shaping and separating the glass into formed masses or charges for the molds of a glass shaping machine. It involves simple and practical means for regulating the temperature of the molten glass in the forehearth or boot of a furnace.

An object of my invention is the provision of simple heating or cooling means, directly controlled by dampers.

A further object is to secure for the formed charges, the best grade of glass, free from dog metal, bubbles and dross.

Other objects will appear hereinafter.

In the drawings:

Figure 1 is a side elevation of a boot or forehearth of a molten glass furnace, constructed in accordance with the principles of my invention.

Fig. 2 is a sectional plan view of same, taken at the plane of the line V—V on Fig. 3.

Fig. 3 is a longitudinal sectional view, taken at the line VI—VI on Fig. 2.

Fig. 4 is a cross-sectional view, taken at the plane of the line VII—VII on Fig. 2, showing the boot heating and cooling chamber.

Referring to the drawings, a boot or forehearth 11 is secured to the side of the furnace tank 12, and provides a flow spout communicating with the tank. The boot 11 is of rectangular shape and is formed in an outer metal casing 13 and provided with an inner lining 14 of any refractory substance, such as clay or silicon compounds. A bushing 17, carried in a metal ring 16, and provided with an orifice 15 through which the glass issues, registers under a similar orifice in the liner 14. Over the boot or container is a cover or roof element 18, also made of refractory material. A plunger 19 passing through the roof 18 may be provided over the discharge orifice 15. This plunger, if provided, is contemplated to be periodically reciprocated vertically in the usual manner, coacting with shears 20, operable by a pneumatic piston (not shown) or other mechanical medium; both the plunger and shears operating in synchronism with molds disposed on a rotary table (not shown).

A central flue or chimney 34, of refractory material, is formed at its lowermost extremity with a transverse channel 35 connected to the channel of the flue 34. The inside lining 14 of the boot is formed to present a reservoir 36 at the end thereof next to the furnace, the walls at the outer end of the reservoir converging into a central depressed throat, or central basin 37, formed in a separate block 14' of lining material, said throat being connected to another basin 38, provided with the discharge orifice 15. The flue 34 projects into the basin 37, and the bottom end thereof functions as a weir or dam.

The liner 14 and casing 13 are channeled transversely of the boot or basin to form a cross-channel 39, immediately under the central basin 37. The liner 14 has, also, vertical channels 40 on each side of the central basin 37, connecting the transverse channel 35 of the flue 34 with the channel 39 under the central basin.

Nozzles 41 furnish heating or cooling products for heating or cooling the central basin. A damper 42 is hingedly mounted at 43 on the top edge of the flue 34 (see Fig. 1). A lever arm 44 fastened to said damper, is raised or lowered by a rod 45, connected thereto and provided with screw threads at its lower terminus, and loosely guided by the bracket 46 secured to the metal casing 13. The said rod 45 is actuated by a hand wheel 47 engaging the said screw threads on the rod and bearing against the lower face of the bracket 46. The central basin 37, it is to be noted, is enveloped by a band of fire, the intensity of which may be regulated by adjusting the damper 42.

In the operation of the above device, glass flowing through the said throat or central basin is diverted upward into the reservoir 38, and then downward through the discharge orifice 15. It is apparent that the best grade of glass will be procured to form the blank charges by this bottom flow method, and, furthermore, glass of the desired temperature and viscosity will be obtained, since the distance between the central basin 37 and the discharge orifice 15 is comparatively small, and since the glass is retained in proximity to the heated or cooled bottom of the container. The regulation of the temperature is thus a simple matter. It is evident that very minute control over the temperature is also provided for.

Modifications of the above may be made within the spirit and scope of my invention.

What I claim is:

1. The combination of a receptacle to contain molten glass, said receptacle being provided with an outlet orifice at the bottom thereof, means to continuously supply molten glass thereto, said receptacle comprising two separate chambers providing a gathering reservoir and a discharge basin, a throat therebetween located below the floor level of the aforesaid chambers, heating or cooling means enveloping said throat, and an adjustable damper controlling said last mentioned means.

2. In a glass feeder, a receptacle containing molten glass, heat regulating means including a central depressed basin in the said receptacle, a reservoir chamber at one side thereof, a discharge chamber having a bottom outlet orifice, said central basin being between the said chambers and being provided with an encircling temperature regulating means, a flue disposed immediately over the said central basin and connected with said last mentioned means, and a damper for said flue and operative to regulate the amount of heating or cooling of said central basin and the glass flowing therethrough.

3. The combination of a glass furnace tank, a flow spout communicating therewith and extending outwardly therefrom, said spout having a bottom outlet opening, and means providing with said spout a passageway for the glass between the tank and said outlet, below the level of the floor of the spout at the outlet.

4. The combination of a glass furnace tank, a flow spout communicating therewith and extending outwardly therefrom, said spout having a bottom outlet opening, and a wall extending across the spout between the tank and the outlet and forming with the spout a channel through which the glass flows to the outlet, said channel being below the level of the floor of the spout at the outlet.

5. The combination of a glass furnace tank, a flow spout communicating therewith and extending outwardly therefrom, said spout having a bottom outlet opening, and a wall extending across the spout between the tank and the outlet and forming with the spout a channel through which the glass flows to the outlet, said channel being positioned to cause the glass to flow below the level of the floor of the spout at the outlet.

6. The combination of a furnace tank, a flow spout communicating therewith, a wall within and extending across the spout below the surface of the glass in the spout and providing a channel, said wall having an interior passageway extending therethrough transversely of the flow spout, the walls of the flow spout being provided with passageways extending therethrough and communicating with said first mentioned passageway, said passageways being shut off from communication with the interior of the flow spout itself, and means for circulating a cooling medium through said passageways.

7. The combination of a furnace tank, a flow spout in communication therewith and extending forwardly from the tank, a wall within and extending across the spout below the surface of the glass in the spout, said wall being provided with an interior passageway extending therethrough transversely of the spout, the walls of the spout being provided with passageways extending therethrough and communicating with said first mentioned passageway, said passageways being shut off from communication with the interior of the spout itself, and means for causing a cooling medium to circulate through said passageways.

8. The combination of a furnace tank, a flow spout in communication therewith and extending forwardly from the tank, a wall extending across the spout and projecting below the surface of the glass in the spout and upwardly a substantial distance above the spout, said wall being provided with an interior passageway extending transversely of the spout and out of communication with the interior of the spout itself, said passageway being extended vertically to the top of said wall to form a flue, the walls of the flow spout being provided with passageways extending therethrough and communicating with said first mentioned passageway, and means for causing a heat regulating medium to circulate through said passageways and up said flue.

Signed at Toledo, in the county of Lucas and State of Ohio, this 17th day of October, 1925.

LEONARD D. SOUBIER.